United States Patent
Honda et al.

(10) Patent No.: US 11,254,195 B2
(45) Date of Patent: Feb. 22, 2022

(54) VEHICLE-BODY STRUCTURE OF VEHICLE

(71) Applicant: MAZDA MOTOR CORPORATION, Hiroshima (JP)

(72) Inventors: Masanori Honda, Hiroshima (JP); Tomohito Okuyama, Kure (JP); Takehisa Kohira, Hiroshima (JP); Ryuji Nonaka, Aki-gun (JP); Toshiyuki Gendo, Hiroshima (JP); Ken Ueki, Hiroshima (JP); Isamu Kizaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/929,006

(22) Filed: Jul. 14, 2020

(65) Prior Publication Data
US 2021/0023920 A1 Jan. 28, 2021

(30) Foreign Application Priority Data

Jul. 23, 2019 (JP) .............................. JP2019-135517

(51) Int. Cl.
*B60J 5/04* (2006.01)
*B62D 25/04* (2006.01)
*B62D 25/02* (2006.01)
*B62D 25/14* (2006.01)
*B62D 25/20* (2006.01)

(52) U.S. Cl.
CPC ............. *B60J 5/0455* (2013.01); *B60J 5/045* (2013.01); *B62D 25/025* (2013.01); *B62D 25/04* (2013.01); *B62D 25/145* (2013.01); *B62D 25/2036* (2013.01)

(58) Field of Classification Search
CPC ...... B60J 5/0455; B60J 5/0427; B60J 5/0456; B62D 21/157
USPC .............................. 296/146.6, 187.12, 146.5
See application file for complete search history.

(56) References Cited

U.S. PATENT DOCUMENTS

| | | |
|---|---|---|
| 2008/0315619 A1 | 12/2008 | Oka |
| 2014/0054929 A1 | 2/2014 | Son et al. |
| 2016/0107512 A1 | 4/2016 | List Clausen et al. |

FOREIGN PATENT DOCUMENTS

| | | |
|---|---|---|
| DE | 10 2004 029 458 A1 | 1/2006 |
| DE | 10 2012 111 327 A1 | 2/2014 |
| DE | 10 2014 115 151 B3 | 2/2016 |
| EP | 3 025 888 A1 | 6/2016 |
| EP | 3 219 590 A1 | 9/2017 |
| FR | 3 050 705 A1 | 11/2017 |

(Continued)

OTHER PUBLICATIONS

The extended European search report issued by the European Patent Office dated Dec. 7, 2020, which corresponds to European Patent Application No. 20185910.5-1009 and is related to U.S. Appl. No. 16/929,006.

*Primary Examiner* — Dennis H Pedder
(74) *Attorney, Agent, or Firm* — Studebaker & Brackett PC

(57) ABSTRACT

A vehicle-body structure of a vehicle comprises a vehicle-body frame member forming an opening portion for entrance at a vehicle side part and a front side door provided so as to open and close the opening portion, wherein the front side door comprises a door panel portion and reinforcement portions provided at a peripheral part of the door panel portion such that the reinforcement portions overlap with the vehicle-body frame member in a vehicle side view, the reinforcement portions being made of a plate member.

7 Claims, 13 Drawing Sheets

(56) References Cited

FOREIGN PATENT DOCUMENTS

| JP | 2018-052138 A | 4/2018 |
| WO | 2018/049319 A1 | 3/2018 |

VEHICLE-BODY STRUCTURE OF VEHICLE

BACKGROUND OF THE INVENTION

The present invention relates to a vehicle-body structure of a vehicle.

Conventionally, in a vehicle which comprises a frame member forming an opening portion for entrance at a vehicle side part and a side door provided so as to open and close the opening portion, a structure of the side door to cope with a vehicle side collision has been developed (see Japanese Patent Laid-Open Publication No. 2018-52138, for example).

The above-described patent document discloses a door for a vehicle which is provided with panel portions which are arranged on a cabin inward side and on a cabin outward side, a frame portion which is arranged between the panel portions, and a reinforcement portion which is arranged at the frame portion, wherein the frame portion comprises front and rear parts which respectively extend in a vertical direction at front-side and rear-side portions of the panel portions and a lower part which interconnects respective lower portions of the front and rear parts, and the reinforcement portion comprises a first reinforcement which interconnects the above-described front and rear parts and a second reinforcement which interconnects the first reinforcement and the above-described lower part.

Herein, a vehicle-body structure of the vehicle is required to suppress a center pillar from coming into a cabin as much as possible in the vehicle side collision. Recently, weight reduction of the vehicle (light-weight vehicle) is also required from viewpoints of the fuel economy and the like. Therefore, it is necessary to compatibly attain the further weight reduction of the vehicle and increasing of the amount of absorption of the collision load (the collision-load absorption performance) in the vehicle side collision. In the door disclosed in the above-described patent document, however, since it is necessary to provide both the frame portion and the reinforcement portion, the weight is so increased that it may be difficult to satisfy the above-described requirements.

SUMMARY OF THE INVENTION

The present invention has been devised in view of the above-described matter, and an object of the present invention is to provide a vehicle-body structure of a vehicle which can compatibly attain the weight reduction of the vehicle and increasing of the amount of absorption of the collision load in the vehicle side collision.

The present invention is a vehicle-body structure of a vehicle, comprising a vehicle-body frame member forming an opening portion for entrance at a vehicle side part, and a side door provided so as to open and close the opening portion, wherein the side door comprises a door panel portion and a reinforcement portion provided at a peripheral part of the door panel portion such that the reinforcement portion overlaps with the vehicle-body frame member in a vehicle side view, the reinforcement portion being made of a plate member.

That is, in the vehicle side collision, the side door is moved (pushed) toward the cabin and comes to contact the vehicle-body frame member. At this moment, the door panel portion receives a reaction load from the vehicle-body frame member in addition to the collision load. According to the present invention, since the reinforcement portion is positioned so as to overlap with the vehicle-body frame member in the vehicle side view (i.e., when viewed from the vehicle width direction), even if the door panel portion receives the collision load and the reaction load from the vehicle-body frame member, deformation of the peripheral part of the door panel portion is suppressed. Thereby, the door panel portion remains contacting with the vehicle-body frame member without coming into the cabin. Consequently, the collision load of the vehicle side collision is transmitted from the side door to the vehicle-body frame member, being dispersed to a whole part of the door panel portion.

Further, since the reinforcement portion is made of the plate member, the weight increase of the side door can be suppressed as much as possible.

Accordingly, the weight reduction of the vehicle and increasing of the amount of absorption of the collision load in the vehicle side collision can be compatibly attained.

In an embodiment of the present invention, the vehicle-body frame member comprises a side sill, a hinge pillar, a center pillar, and a roof side rail, the peripheral part of the door panel portion comprises plural overlapping portions which respectively overlap with the side sill, the hinge pillar, the center pillar, and the roof side rail in the vehicle side view, and the reinforcement portion comprises a lower-side reinforcement portion attached to the overlapping portion which overlaps with the side sill, a front-side reinforcement portion attached to the overlapping portion which overlaps with the hinge pillar, a rear-side reinforcement portion attached to the overlapping portion which overlaps with the center pillar, and an upper-side reinforcement portion attached to the overlapping portion which overlaps with the roof side rail.

According to this embodiment, since the reinforcement portions are respectively provided at a front side, a rear side, an upper side, and a lower side of the side door, the deformation of the side door can be effectively suppressed in the vehicle side collision. Thereby, the collision load can be transmitted from a whole part of the side door to the vehicle-body frame member. Consequently, the amount of absorption of the collision load in the vehicle side collision can be more increased.

In another embodiment of the present invention, the vehicle-body frame member comprises a floor cross member provided at a position which overlaps with the side sill in the vehicle side view and extending in a vehicle width direction, and the lower-side reinforcement portion is configured to overlap with the floor cross member in the vehicle side view.

According to this embodiment, since the floor cross member extends in the vehicle width direction, a portion of the side sill which overlaps with the floor cross member has high rigidity against the collision load applied from the vehicle side. Accordingly, since the lower-side reinforcement is configured to overlap with the floor cross member in the vehicle side view (i.e., when viewed from the vehicle width direction), the collision load of the vehicle side collision can be effectively transmitted to the vehicle-body frame member. Thereby, the amount of absorption of the collision load in the vehicle side collision can be further increased.

In another embodiment of the present invention, the vehicle-body frame member comprises an instrument-panel member provided at a position which overlaps with the hinge pillar in the vehicle side view and extending in the vehicle width direction, and the front-side reinforcement portion is configured to overlap with the instrument-panel member in the vehicle side view.

According to this embodiment, since the instrument-panel member extends in the vehicle width direction, a portion of the hinge pillar which overlaps with the instrument-panel member has high rigidity against the collision load applied from the vehicle side. Accordingly, since the front-side reinforcement portion is configured to overlap with the instrument-panel member in the vehicle side view (i.e., when viewed from the vehicle width direction), the collision load of the vehicle side collision can be effectively transmitted to the vehicle-body frame member. Thereby, the amount of absorption of the collision load in the vehicle side collision can be more further increased.

The present invention will become apparent from the following description which refers to the accompanying drawings.

DETAILED DESCRIPTION OF THE INVENTION

Figure 1:
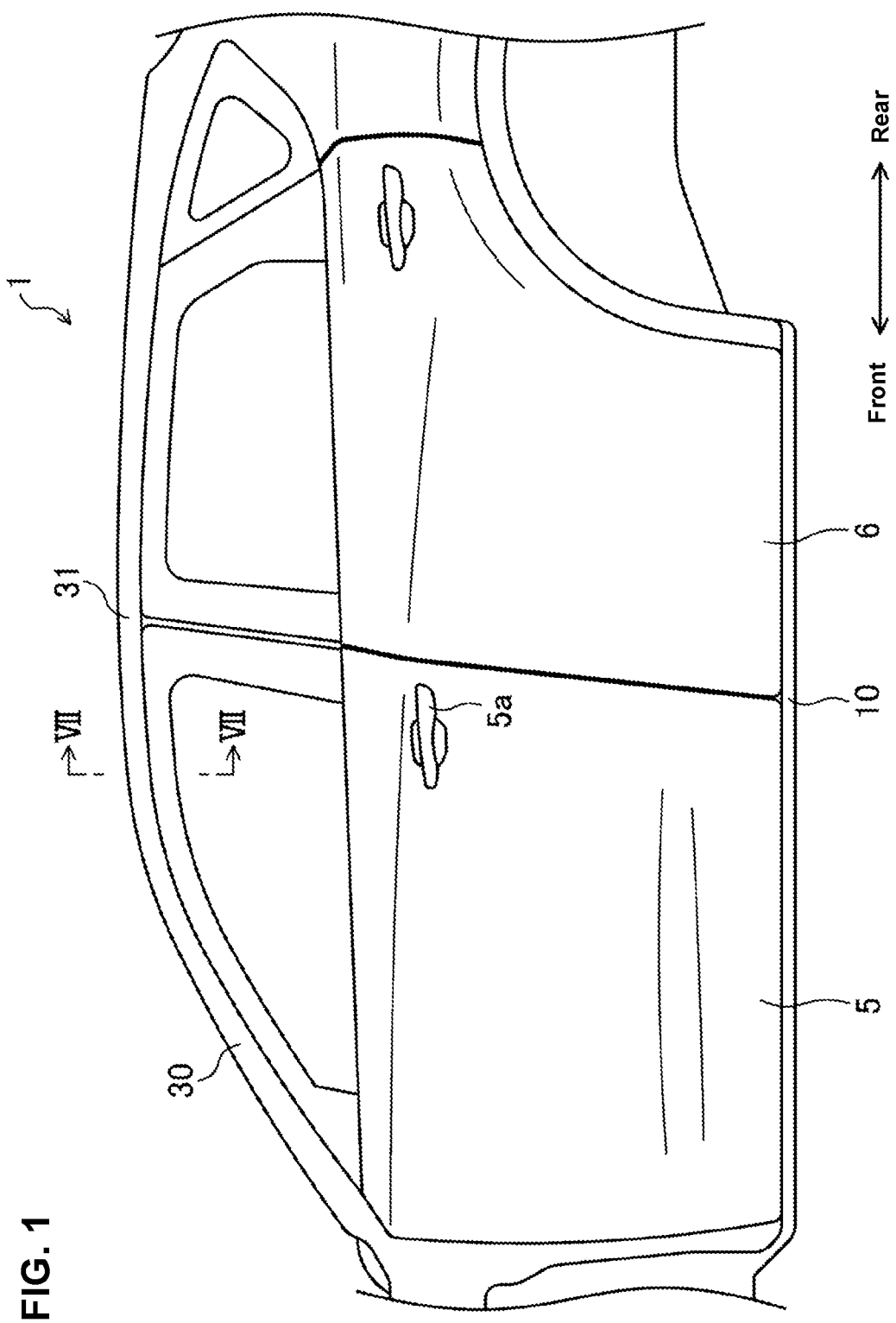
FIG. 1 is a side view showing a left-side side part of a vehicle provided with a vehicle-body structure of the vehicle according to an embodiment of the present invention, which shows around a front side door.

Hereafter, an embodiment of the present invention will be described referring to the drawings. In the following description, front, rear, left, right, upper and lower which respectively mean directions relative to a vehicle 1 will be simply referred to as "front," "rear," "left," "right," "upper," and "lower."

FIG. 1 shows a left-side side part of the vehicle 1 to which a vehicle-body structure according to the present embodiment is applied. The vehicle 1 is a 4-door type of passenger car. In the present embodiment, since the vehicle-body structure of the vehicle 1 is configured to be laterally symmetrical, the vehicle-body structure of the left-side part of the vehicle 1 will be described specifically only, and detailed explanation of the one of a right-side part of the vehicle 1 will be omitted. Further, in the following description, there is a case where an inward side, in a vehicle width direction, of the vehicle 1 will be simply referred to as "right side" and also an outward side, in the vehicle width direction, of the vehicle 1 will be simply referred to as "left side."

The vehicle 1 comprises a vehicle-body frame member 2 which forms front-side and rear-side opening portions for entrance 3, 4 at its left-side side part, through which a passenger gets on or gets off. A front side door 5 is arranged at the front-side opening portion 3 so as to open and close this opening portion 3. A rear side door 6 is arranged at the rear-side opening portion 4 so as to open and close this opening portion 4.

Figure 2:
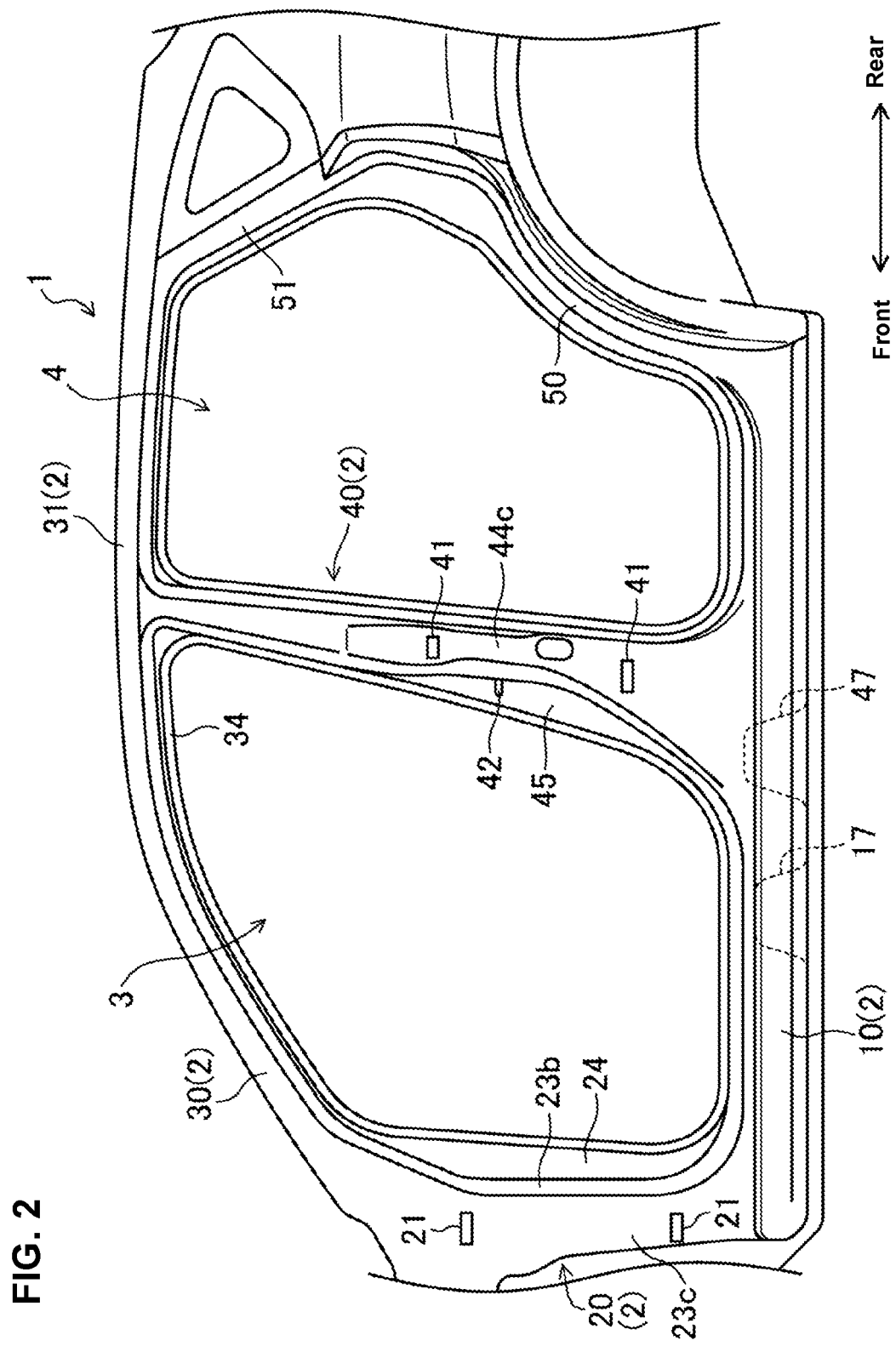
FIG. 2 is a side view showing a vehicle-body frame member at the left-side side part of the vehicle.

The vehicle-body frame member 2 comprises, as shown in FIG. 2, a side sill 10 which is arranged at a lower part of the vehicle 1 and extends in a longitudinal direction, a hinge pillar 20 which extends upwardly from a front-side end portion of the side sill 10, a front pillar 30 which extends obliquely rearwardly-and-upwardly from an upper-side end portion of the hinge pillar 20, and a roof side rail 31 which continuously extends rearwardly from a rear-side end portion of the front pillar 30. The vehicle-body frame member 2 further comprises a center pillar 40 which extends in a vertical direction and interconnects a central part, in the longitudinal direction, of the side sill 10 and a central part, in the longitudinal direction, of the roof side rail 31. The front-side opening portion 3 is partitioned by the side sill 10, the hinge pillar 20, the front pillar 30, the roof side rail 31, and the center pillar 40.

Further, the vehicle-body frame member 2 comprises a wheel arch 50 which extends upwardly-and-rearwardly in an arch shape from a rear-side end portion of the side sill 10 and forms a part of a wheel house and a quarter pillar 51 which extends vertically and interconnects the wheel arch 50 and the roof side rail 31. The rear-side opening portion 4 is partitioned by the side sill 10, the roof side rail 31, the center pillar 40, the wheel arch 50, and the quarter pillar 51.

Figure 4:
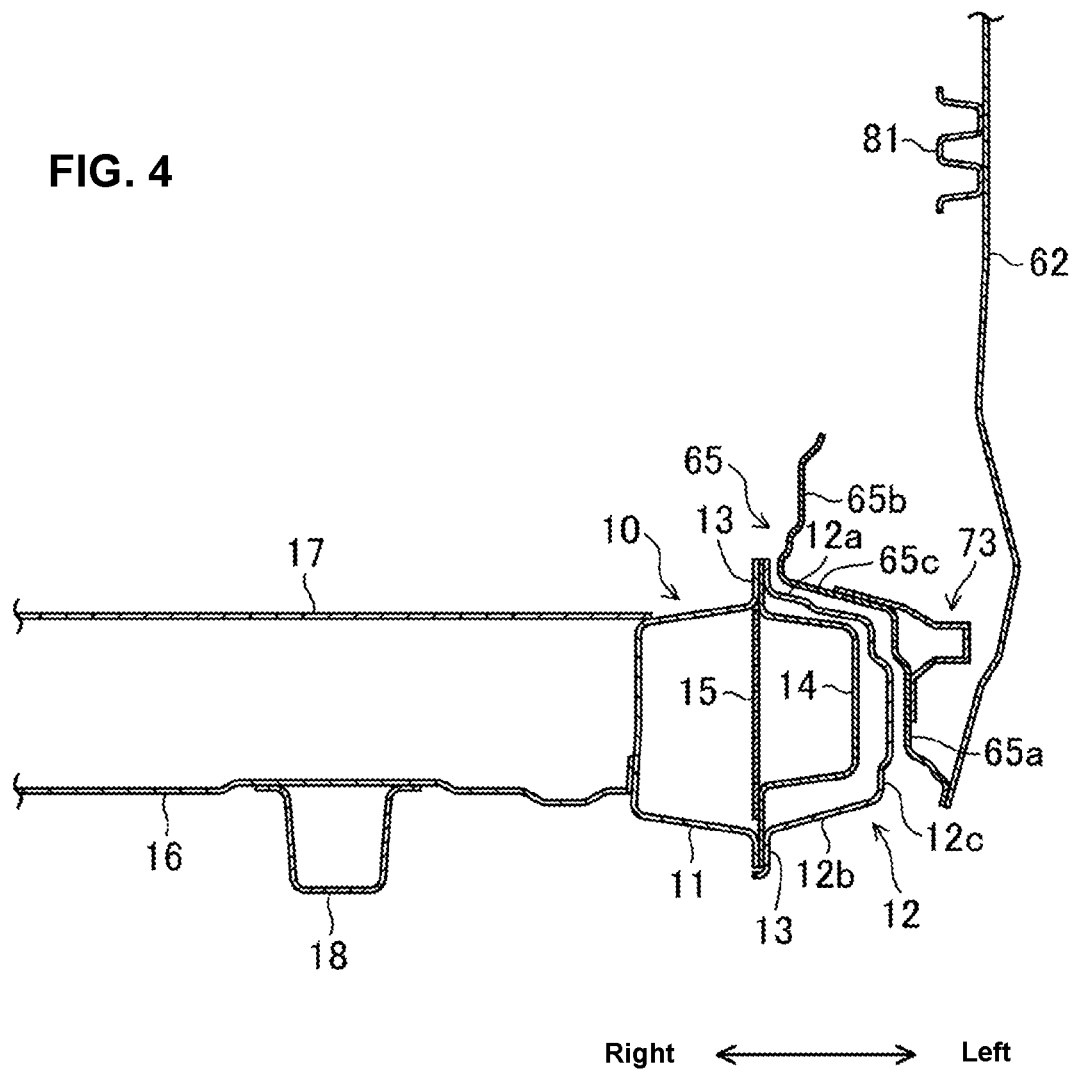
FIG. 4 is a sectional view taken along line IV-IV of FIG. 3.

The side sill 10 comprises, as shown in FIG. 4, a side-sill inner panel 11 which is positioned on the inward side, in the vehicle width direction, of the vehicle 1 (on the right side in this figure) and has a hat-shaped cross section and a side-sill outer panel 12 which is positioned on the outward side, in the vehicle width direction, of the vehicle 1 (on the left side in this figure) and has a hat-shaped cross section. The cross section of the side-sill inner panel 11 is opened to the left side, and the cross section of the side-sill outer panel 12 is opened to the right side. Each of the side-sill inner panel 11 and the side-sill outer panel 12 has side-sill flanges 13 which extend in the vertical direction and in the longitudinal direction at its upper-side end portion and its lower-side end portion. The respective side-sill flanges 13 overlap with each other in the vehicle width direction and are welded together. Thus, a closed-cross section is formed by the side-sill inner panel 11 and the side-sill outer panel 12.

The side-sill outer panel 12 comprises, as shown in FIG. 4, a side-sill upper wall portion 12a which extends toward the left side from a lower-side end portion of the upper-side side-sill flange 13, a side-sill lower wall portion 12b which extends, facing the side-sill upper wall portion 12a in the vertical direction, and a side-sill side wall portion 12c which interconnects a left-side end portion of the side-sill upper wall portion 12a and a left-side end portion of the side-sill lower wall portion 12b in the vertical direction.

A first side-sill reinforcement 14 and a second side-sill reinforcement 15 are provided inside the side sill 10. The first side-sill reinforcement 14 is configured to have a hat-shaped cross section which is opened to the right side, and arranged along the side-sill outer panel 12. The second side-sill reinforcement 15 is of a flat plate shape. Respective end portion, in the vertical direction, of the first side-sill reinforcement 14 overlap with the respective side-sill flanges 13 in the vehicle width direction and are welded together with the side-sill flanges 13. The second side-sill reinforcement 15 is welded to a right side of the first side-sill reinforcement 14.

As shown in FIG. 4, a left-side end portion of a floor panel 16 which expands in the longitudinal direction and in the vehicle width direction is joined to a lower-side portion of the side-sill inner panel 11. Further, a left-side end portion of a first floor cross member 17 which extends in the vehicle width direction is joined to an upper-side portion of the side-sill inner panel 11. A floor side rail 18 which extends in the longitudinal direction is joined to a lower face of the floor panel 16.

The hinge pillar 20 comprises two front-door hinges 21 to support the front side door 5. The two front-door hinges 21 are provided to be spaced apart from each other in the vertical direction.

Figure 5:
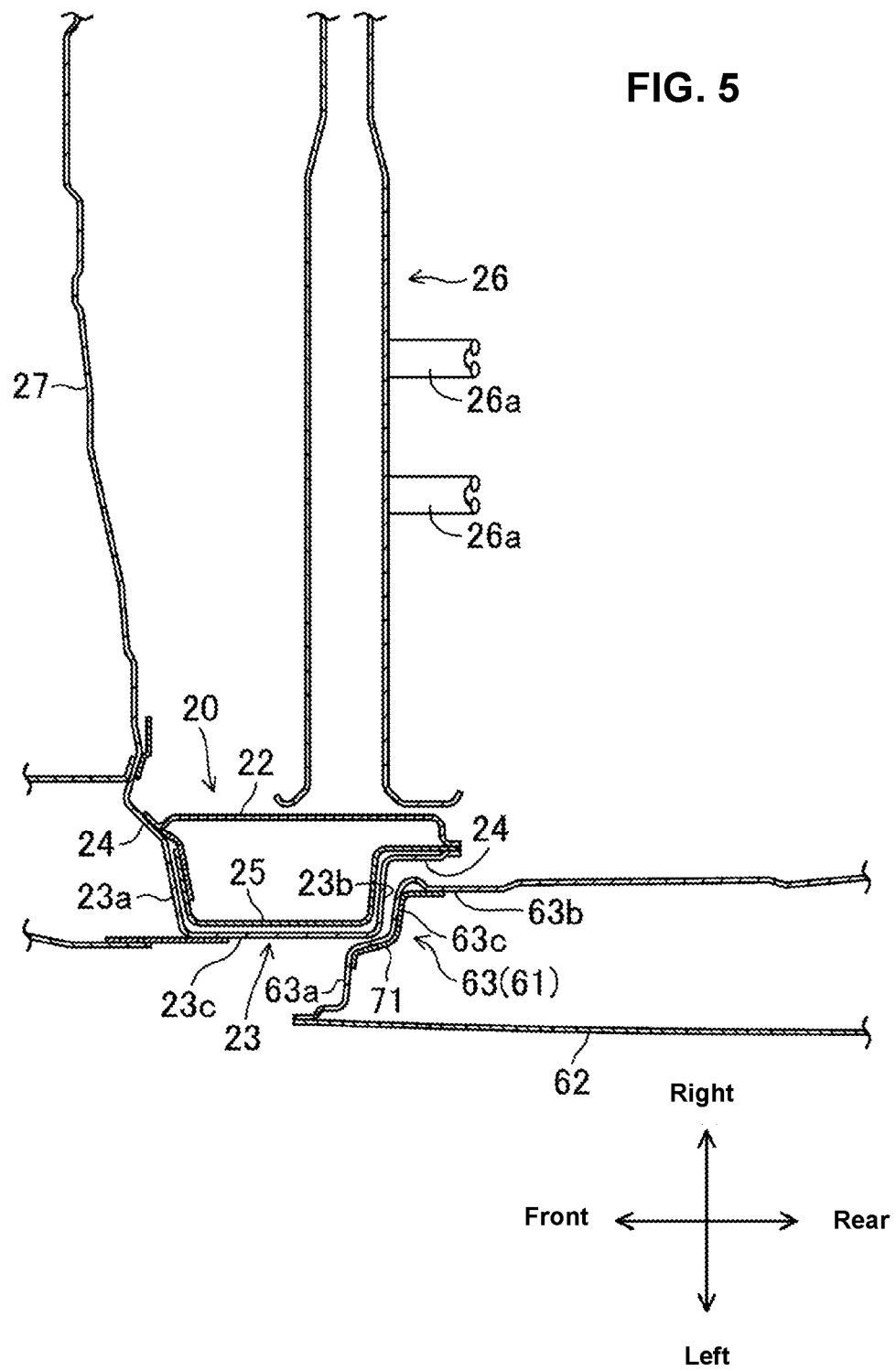
FIG. 5 is a sectional view taken along line V-V of FIG. 3.

The hinge pillar 20 comprises, as shown in FIG. 5, a hinge-pillar inner panel 22 which is positioned on the inward side, in the vehicle width direction, of the vehicle 1 (on the right side in this figure) and has a hat-shaped cross section and a hinge-pillar outer panel 23 which is positioned on the outward side, in the vehicle width direction, of the vehicle 1 (on the left side in this figure) and has a hat-shaped cross section. The cross section of the hinge-pillar inner panel 22 is opened to the left side, and the cross section of the hinge-pillar outer panel 23 is opened to the right side. Each of the hinge-pillar inner panel 22 and the hinge-pillar outer panel 23 has hinge-pillar flanges 24 which extend in the vertical direction and in the longitudinal direction at its front-side end portion and its rear-side end portion. The respective hinge-pillar flanges 24 overlap with each other in the vehicle width direction and are welded together. Thus, a closed-cross section is formed by the hinge-pillar inner panel 22 and the hinge-pillar outer panel 23.

The hinge-pillar outer panel 23 comprises, as shown in FIG. 5, a hinge-pillar front wall portion 23a which extends toward the left side from a rear-side end portion of the upper-side hinge-pillar flange 24, a hinge-pillar rear wall portion 23b which extends, facing the hinge-pillar front wall portion 23a in the longitudinal direction, and a hinge-pillar side wall portion 23c which interconnects a left-side end portion of the hinge-pillar front wall portion 23a and a left-side end portion of the hinge-pillar rear wall portion 23b in the longitudinal direction.

A hinge-pillar reinforcement 25 is provided inside the hinge pillar 20. The hinge-pillar reinforcement 25 is configured to have a hat-shaped cross section which is opened to the right side, and arranged along the hinge-pillar outer panel 23. Respective end portions, in the longitudinal direction, of the hinge-pillar reinforcement 25 overlap with the respective hinge-pillar flanges 24 in the vehicle width direction and are welded together with the hinge-pillar flanges 24. Herein, in FIG. 5, the front-side end portion of the hinge-pillar reinforcement 25 does not overlap with the hinge-pillar flange 24. At another part of the hinge-pillar reinforcement 25, however, its front-side end portion overlaps with the hinge-pillar flanges 24 as well.

As shown in FIG. 5, a left-side end portion of an instrument-panel member 26 is joined to the hinge-pillar inner panel 22. The instrument-panel member 26 is provided with hinges 26a to pivotably support a glove box in the vertical direction and others. A dash panel 27 which partitions a cabin from an engine room is joined to a front-side end portion of the hinge-pillar inner panel 22.

The center pillar 40 is provided with two rear-door hinges 41 to support the openable rear side door 6. The two rear-door hinges 41 are provided to be spaced apart from each other in the vertical direction. The center pillar 40 is further provided with a striker 42 at its front-side position which is located slightly below the upper-side rear-door hinge 41. The striker 42 is a member to lock the front side door 5 in a closed state.

Figure 6:
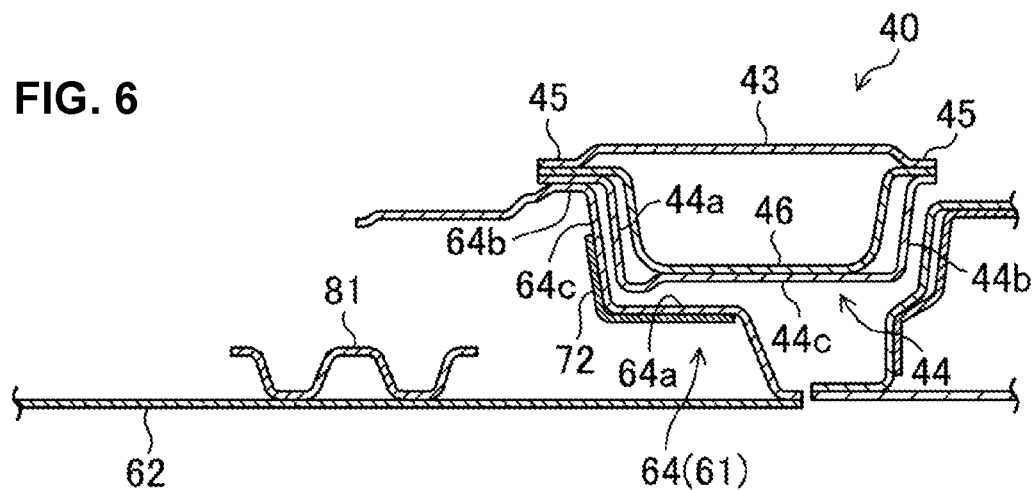
FIG. 6 is a sectional view taken along line VI-VI of FIG. 3.

The center pillar 40 comprises, as shown in FIG. 6, a center-pillar inner panel 43 which is positioned on the inward side, in the vehicle width direction, of the vehicle 1 (on the right side in this figure) and has a hat-shaped cross section and a center-pillar outer panel 44 which is positioned on the outward side, in the vehicle width direction, of the vehicle 1 (on the left side in this figure) and has a hat-shaped cross section. The cross section of the center-pillar inner panel 43 is opened to the left side, and the cross section of the center-pillar outer panel 44 is opened to the right side. Each of the center-pillar inner panel 43 and the center-pillar outer panel 44 has center-pillar flanges 45 which extend in the vertical direction and in the longitudinal direction at its front-side end portion and its rear-side end portion. The respective center-pillar flanges 45 overlap with each other in the vehicle width direction and are welded together. Thus, a closed-cross section is formed by the center-pillar inner panel 43 and the center-pillar outer panel 44.

The center-pillar outer panel 44 comprises, as shown in FIG. 6, a center-pillar front wall portion 44a which extends toward the left side from a rear-side end portion of the front-side center-pillar flange 45, a center-pillar rear wall portion 44b which extends, facing the center-pillar front wall portion 44a in the longitudinal direction, and a center-pillar side wall portion 44c which interconnects a left-side end portion of the center-pillar front wall portion 44a and a left-side end portion of the center-pillar rear wall portion 44b in the longitudinal direction.

A center-pillar reinforcement 46 is provided inside the center pillar 40. The center-pillar reinforcement 46 is configured to have a hat-shaped cross section which is opened to the right side, and arranged along the center-pillar outer panel 44. Respective end portion, in the longitudinal direction, of the center-pillar reinforcement 46 overlap with the respective center-pillar flanges 45 in the vehicle width direction and are welded together with the center-pillar flanges 45.

As shown in FIG. 2, a lower-side end portion of the center pillar 40 is located at the same position as a second floor cross member 47 which extends in the vehicle width direction.

Figure 7:
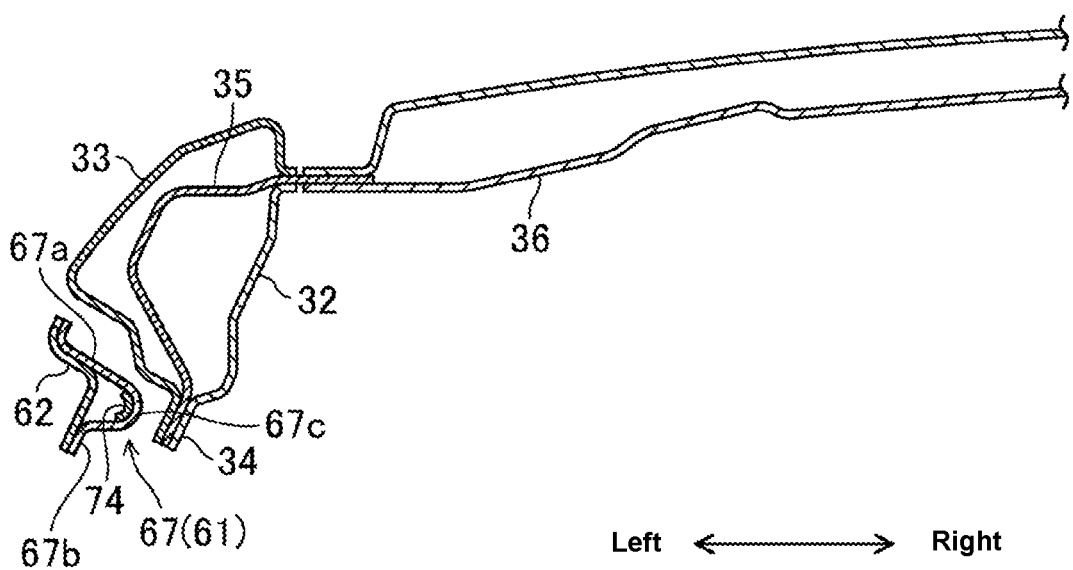
FIG. 7 is a sectional view taken along line VII-VII of FIG. 1.

The roof side rail 31 comprises, as shown in FIG. 7, a roof-side inner panel 32 which is positioned on the inward side, in the vehicle width direction, of the vehicle 1 (on the right side in this figure) and a roof-side outer panel 33 which is positioned on the outward side, in the vehicle width direction, of the vehicle 1 (on the left side in this figure) and has a C-shaped cross section. The cross section of the roof-side outer panel 33 is opened to the right side. The roof-side outer panel 33 has a roof-side flange 34 which extends in the vertical direction and in the longitudinal direction at its lower-side end portion. The roof-side flange 34 overlaps with a lower-side end portion of the roof-side inner panel 32 in the vehicle width direction and these are welded together. An upper-side end portion of the roof-side outer panel 33 overlaps with an upper-side end portion of the roof-side inner panel 32 in the vehicle width direction and these are welded together. Thus, a closed-cross section is formed by the roof-side inner panel 32 and the roof-side outer panel 33.

A roof-side reinforcement 35 is provided inside the roof side rail 31. The roof-side reinforcement 35 is configured to have a hat-shaped cross section which is opened to the right side, and arranged along the roof-side outer panel 33. A lower-side end portion of the roof-side reinforcement 35 overlaps with a lower-side end portion of the roof-side inner panel 32 and the roof-side flange 34 of the roof-side outer panel 33 in the vehicle width direction and these are welded together. Meanwhile, an upper-side end portion of the roof-side reinforcement 35 overlaps with an upper-side end portion of the roof-side inner panel 32 and an upper-side end portion of the roof-side outer panel 33 in the vehicle width direction and these are welded together.

As shown in FIG. 7, a roof cross member 36 which extends in the vehicle width direction is provided on the right side of the roof side rail 31. A left-side end portion of the roof cross member 36 is joined to the roof side rail 31.

Next, the front side door 5 will be described as an example of a side-door structure. In the following description, a state where the front side door 5 closes the front-side opening portion 3 is a premise. Herein, while detailed description of the rear side door 6 is omitted, the rear side door 6 has substantially the same structure as the front side door 5 except a shape of a door panel portion 60 and a shape of a reinforcement portion, which will be described later.

The front side door 5 comprises, as shown in FIGS. 4-8, the door panel portion 60 which has a door inner panel 61 which is positioned on the inward side, in the vehicle width direction, of the vehicle (on the right side in this figure) and a door outer panel 62 which is positioned on the outward side, in the vehicle width direction, of the vehicle (on the left side in this figure). The door inner panel 61 and the door outer panel 62 are welded together so as to have a closed-cross section formed thereby. A door trim is joined to a face of the door inner panel 61 which is opposite to the door outer panel 62.

Figure 3:
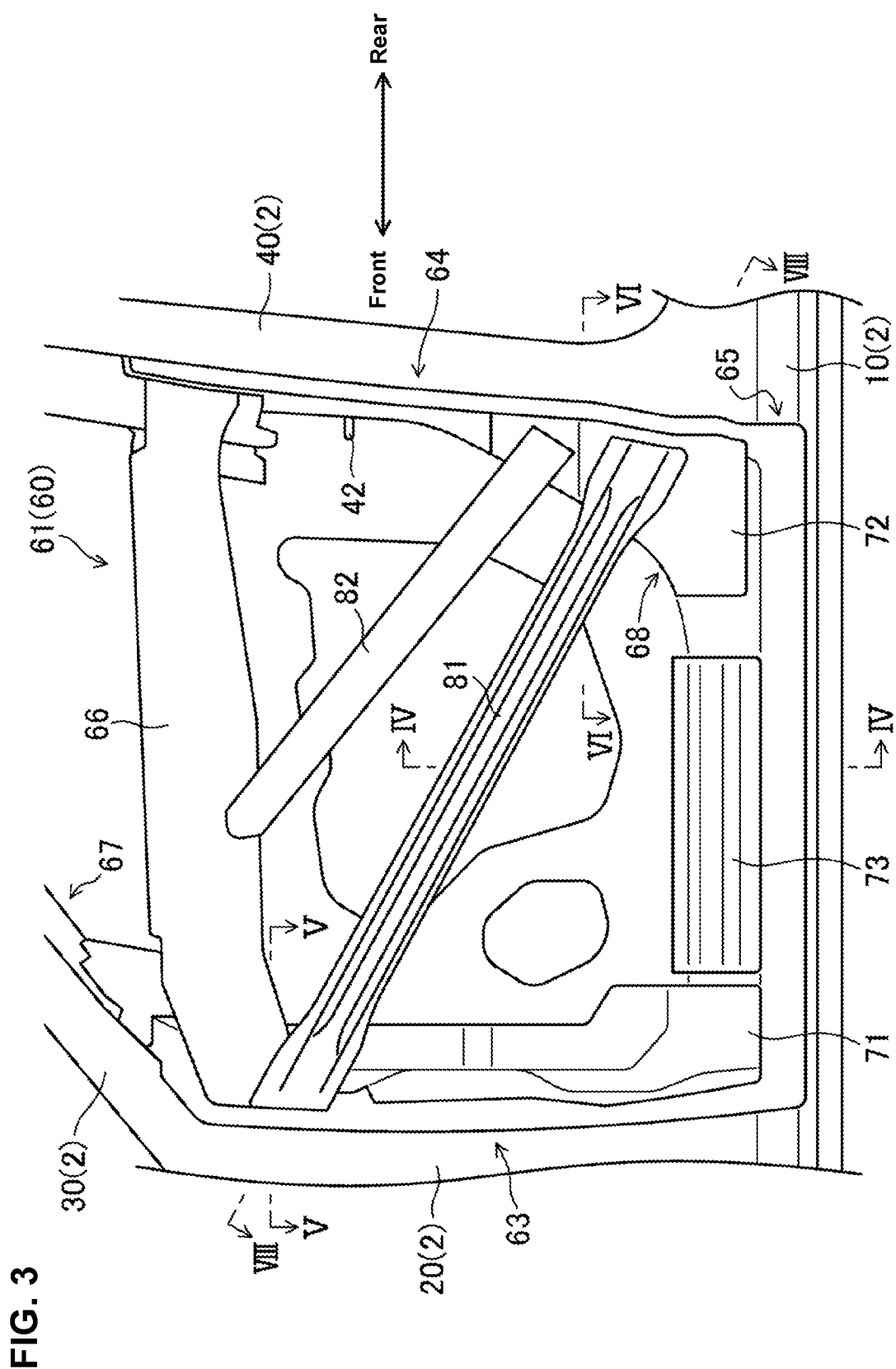
FIG. 3 is a side view showing a state where an outer panel of the front side door is removed, when viewed from a vehicle left side.

The door inner panel 61 is made of a single-sheet steel plate. The door inner panel 61 is formed along a periphery of the front-side opening portion 3 as shown in FIG. 3. The door inner panel 61 comprises an inner front portion 63 which extends in the vertical direction along the hinge pillar 20, an inner rear portion 64 which extends in the vertical direction along a lower part of the center pillar 40, and an inner lower portion 65 which extends along the side sill 10 and interconnects a lower-side end portion of the inner front portion 63 and a lower-side end portion of the inner rear portion 64. The door inner panel 61 further comprises a beltline portion 66 which extends straightly in the longitudinal direction and interconnects an upper-side end portion of the inner front portion 63 and an upper-side end portion of the inner rear portion 64. The door inner panel 61 further comprises a window frame portion 67 which forms a quarter-window opening portion which is closed with a window glass. A corner portion between the inner rear portion 64 and the inner lower portion 65 of the door inner panel 61 is configured as a curved portion 68 which is curved smoothly from the inner rear portion 64 toward the inner lower portion 65.

The inner front portion 63 comprises, as shown in FIG. 5, a front-side outer wall portion 63*a* which is positioned at the outside, in a surface direction, of the door inner panel 61 (on the front side in this figure), a front-side inner wall portion 63*b* which is positioned on the inside, in the surface direction, (on the rear side in this figure) of the front-side outer wall portion 63*a*, and a front-side connection wall portion 63*c* which interconnects the front-side outer wall portion 63*a* and the front-side inner wall portion 63*b* in the vehicle width direction. The front-side outer wall portion 63*a* comprises a part which expands in the longitudinal direction and in the vertical direction and another part which expands in the vehicle width direction and in the vertical direction continuously from a front-side end portion of the above-described part. The front-side inner wall portion 63*b* expands in the longitudinal direction and in the vertical direction. The front-side connection wall portion 63*c* expands in the vehicle width direction and in the vertical direction so as to interconnect a rear-side end portion of the front-side outer wall portion 63*a* and a front-side end portion of the front-side inner wall portion 63*b*. The front-side outer wall portion 63*a* extends in the vertical direction such that this portion 63*a* overlaps with the rear-side hinge-pillar flange 24 and the hinge-pillar side wall portion 23*c* of the hinge pillar 20 in the vehicle side view (i.e., when viewed from the vehicle width direction). The front-side inner wall portion 63*b* extends in the vertical direction such that this portion 63*b* overlaps with the rear-side hinge-pillar flange 24 of the hinge pillar 20 in the vehicle side view (i.e., when viewed from the vehicle width direction). The inner front portion 63 forms an overlapping portion which overlaps with the hinge pillar 20.

The inner rear portion 64 comprises, as shown in FIG. 6, a rear-side outer wall portion 64*a* which is positioned at the outside, in a surface direction, of the door inner panel 61 (on the rear side in this figure), a rear-side inner wall portion 64*b* which is positioned on the inside, in the surface direction, (on the front side in this figure) of the rear-side outer wall portion 64*a*, and a rear-side connection wall portion 64*c* which interconnects the rear-side outer wall portion 64*a* and the rear-side inner wall portion 64*b* in the vehicle width direction. The rear-side outer wall portion 64*a* comprises a part which expands in the longitudinal direction and in the vertical direction and another part which expands in the vehicle width direction and in the vertical direction continuously from a rear-side end portion of the above-described part. The rear-side inner wall portion 64*b* expands in the longitudinal direction and in the vertical direction. The rear-side connection wall portion 64*c* expands in the vehicle width direction and in the vertical direction so as to interconnect a front-side end portion of the rear-side outer wall portion 64*a* and a rear-side end portion of the rear-side inner wall portion 64*b*. A ridgeline is formed between the rear-side connection wall portion 64*c* and the rear-side outer wall portion 64*a*. The rear-side outer wall portion 64*a* extends in the vertical direction such that this portion 64*a* overlaps with the front-side center-pillar flange 45 and the center-pillar side wall portion 44*c* of the center pillar 40 in the vehicle side view (i.e., when viewed from the vehicle width direction). The rear-side inner wall portion 64*b* extends in the vertical direction such that this portion 64*b* overlaps with the front-side center-pillar flange 45 of the center pillar 40 in the vehicle side view (i.e., when viewed from the vehicle width direction). The inner rear portion 64 forms an overlapping portion which overlaps with the center pillar 40

An opening portion for exposing the striker 42 to a door inside (to a space between the door inner panel 61 and the door outer panel 62) is provided at a part of the door-inner rear portion 64 which corresponds to the striker 42. A door latch is provided at a position of this opening portion of the inner rear portion 64, which is not illustrated. An engagement state of this door latch with the striker 42 is controlled by operating a door handle 5*a* (see FIG. 1).

The inner lower portion 65 comprises, as shown in FIG. 4, a lower-side outer wall portion 65*a* which is positioned at the outside, in the surface direction, of the door inner panel 61 (on the lower side in this figure), a lower-side inner wall portion 65*b* which is positioned on the inside, in the surface direction, (on the upper side in this figure) of the lower-side outer wall portion 65*a*, and a lower-side connection wall portion 65*c* which interconnects the lower-side outer wall portion 65*a* and the lower-side inner wall portion 65*b* in the vehicle width direction. The lower-side outer wall portion 65*a* and the lower-side inner wall portion 65*b* expand in the longitudinal direction and in the vertical direction. The lower-side connection wall portion 65*c* expands in the vehicle width direction and in the longitudinal direction so as to interconnect an upper-side end portion of the lower-side outer wall portion 65*a* and a lower-side end portion of the lower-side inner wall portion 65*b*. A ridgeline is formed between the lower-side connection wall portion 65*c* and the lower-side outer wall portion 65*a*. The lower-side outer wall portion 65*a* extends in the longitudinal direction such that this portion 65*a* overlaps with the upper-side side-sill flange 13 and the side-sill side wall portion 12*c* of the side sill 10 in the vehicle side view (i.e., when viewed from the vehicle width direction). The lower-side inner wall portion 65*b* extends in the longitudinal direction such that this portion 65*b* overlaps with the upper-side side-sill flange 13 of the side sill 10 in the vehicle side view (i.e., when viewed from the vehicle width direction). The inner lower portion 65 forms an overlapping portion which overlaps with the side sill 10.

The window frame portion 67 comprises, as shown in FIG. 7, an upper-side outer wall portion 67*a* which is positioned at the outside, in the surface direction, of the door inner panel 61 (on the upper side in this figure), an upper-side inner wall portion 67*b* which is positioned on the inside, in the surface direction, (on the lower side in this figure) of the upper-side outer wall portion 67*a*, and an upper-side connection wall portion 67*c* which interconnects the upper-side outer wall portion 67*a* and the upper-side inner wall portion 67*b* in the vertical direction and in the vehicle width direction. The upper-side outer wall portion 67*a* expands in the longitudinal direction and in the vehicle width direction and slants downwardly toward the right side. The upper-side inner wall portion 67*b* expands in the longitudinal direction and in the vertical direction. The lower-side connection wall portion 65*c* is curved downwardly toward the left side from a right-side end portion of the upper-side outer wall portion 67*a* so as to interconnect a right-side end portion of the upper-side outer wall portion 67*a* and an upper-side end portion of the upper-side inner wall portion 67*b*. The upper-side outer wall portion 67*a* and the upper-side connection portion 67*c* extend such that they overlap with the roof-side flange 34 in the vehicle sideview (i.e., when viewed from the vehicle width direction). The window frame portion 67 forms an overlapping portion which overlaps with the roof side rail 31.

As shown in FIG. 3, a first impact bar 81 and a second impact bar 82 are attached to the door inner panel 61. The first impact bar 81 extends obliquely rearwardly-and-downwardly and interconnects an upper-side end portion of the inner front portion 63 and a lower-side end portion of the inner rear portion 64. The second impact bar 82 extends obliquely rearwardly-and-downwardly so as to interconnect a middle part, in the longitudinal direction, of the beltline portion 66 and a middle part, in the vertical direction, of the inner rear portion 64. The first impact bar 81 is configured such that both-side end portions, in the longitudinal direction, thereof have a hat-shaped cross section and a middle portion, in the longitudinal direction, thereof has an M-shaped cross section as shown in FIGS. 4 and 6.

As shown in FIGS. 3-8, plural reinforcement portions are provided at a peripheral portion of the door inner panel 61. Specifically, the reinforcement portions include a front-side reinforcement portion 71 which is provided along the inner front portion 63, a rear-side reinforcement portion 72 which is provided along the inner rear portion 64, a lower-side reinforcement portion 73 which is provided along the inner lower portion 65, and an upper-side reinforcement portion 74 which is provided at the window frame portion 67. The reinforcement portions 71-74 may be made of a plate member which is made from hot material, for example.

The front-side reinforcement portion 71 is a patch member which is attached along the front-side outer wall portion 63*a*, the front-side inner wall portion 63*b*, and the front-side connection wall portion 63*c* as shown in FIG. 3. That is, the front-side reinforcement portion 71 is provided to straddle a ridgeline between the front-side outer wall portion 63*a* and the front-side connection wall portion 63*c*. The front-side reinforcement portion 71 is, as shown in FIG. 5, provided to overlap with the hinge-pillar side wall portion 23*c* of the hinge pillar 20 in the vehicle side view (i.e., when viewed from the vehicle width direction). Further, the front-side reinforcement portion 71 is provided to overlap with the instrument-panel member 26 in the vehicle side view (i.e., when viewed from the vehicle width direction).

Figure 8:
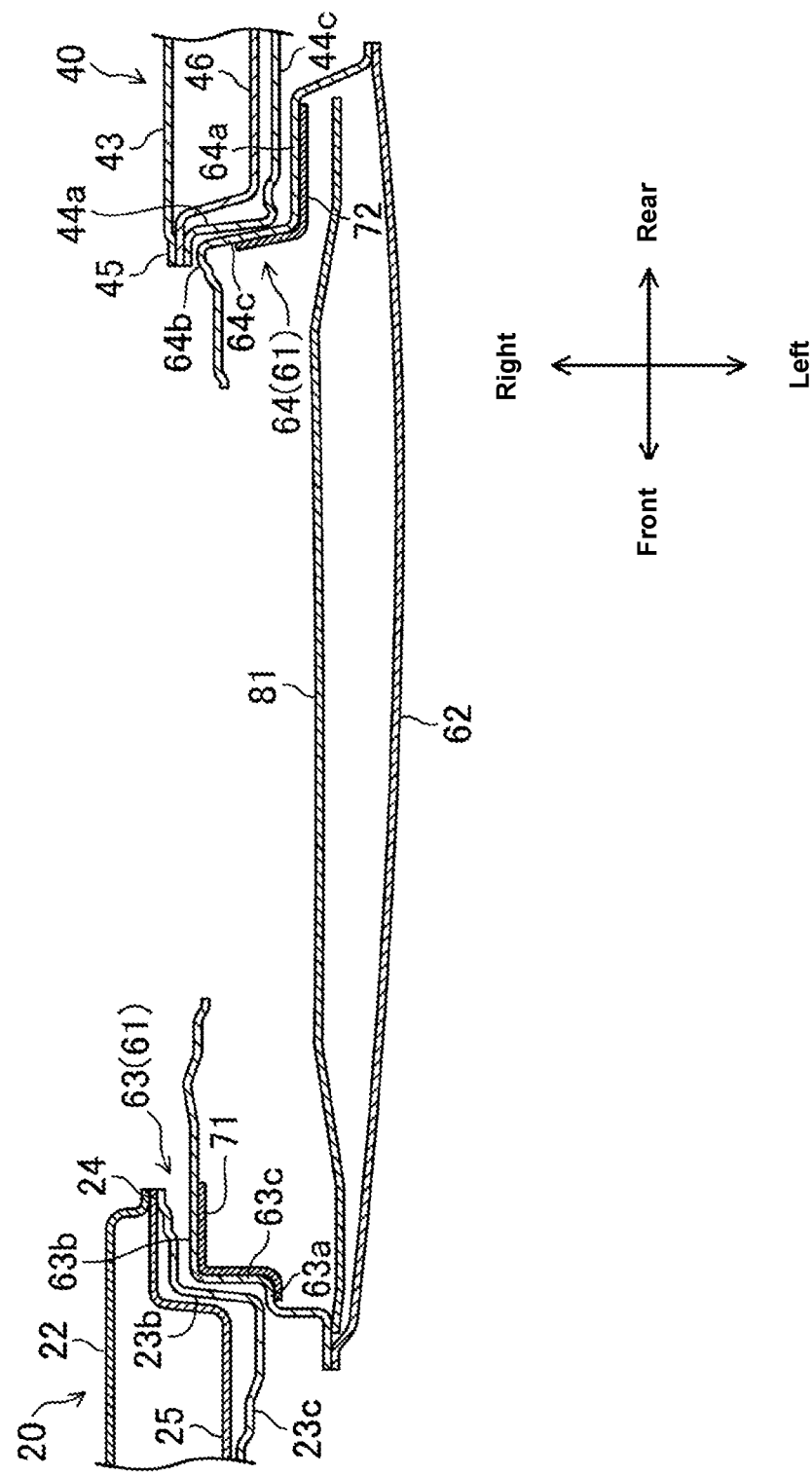
FIG. 8 is a sectional view taken along line VIII-VIII of FIG. 3.

The front-side reinforcement portion 71 is provided to overlap with an upper-side end portion of the first impact bar 81 in the vehicle side view (i.e., when viewed from the vehicle width direction) as shown in FIGS. 3 and 8. The front-side reinforcement portion 71 is welded to the inner front portion 63 in a state where this portion 71 overlaps with the first impact bar 81 and the inner front portion 63 (specifically, the front-side outer wall portion 63*a*) at a joint position of the first impact bar 81 to the door inner panel 61, which is not illustrated.

The rear-side reinforcement portion 72 is a patch member which is attached along the rear-side outer wall portion 64 and the rear-side connection wall portion 64*c* as shown in FIG. 3. That is, the rear-side reinforcement portion 72 is provided to straddle a ridgeline between the rear-side outer wall portion 64*a* and the rear-side connection wall portion 64*c*. The rear-side reinforcement portion 72 is, as shown in FIG. 5, provided to overlap with the front-side center-pillar flange 45 and the center-pillar side wall portion 44*c* of the center pillar 40 in the vehicle side view (i.e., when viewed from the vehicle width direction). Further, the rear-side reinforcement portion 72 is located at the same position, in the longitudinal direction, as the second floor cross member 47.

The rear-side reinforcement portion 72 is, as shown in FIGS. 3 and 8, provided to overlap with a lower-side end portion of the first impact bar 81 in the vehicle side view (i.e., when viewed from the vehicle width direction). The rear-side reinforcement portion 72 is welded to the inner rear portion 64 in a state where this portion 72 overlaps with the first impact bar 81 and the inner rear portion 64 (specifically, the rear-side outer wall portion 64*a*) at a joint position of the first impact bar 81 to the door inner panel 61, which is not illustrated.

Figure 9:
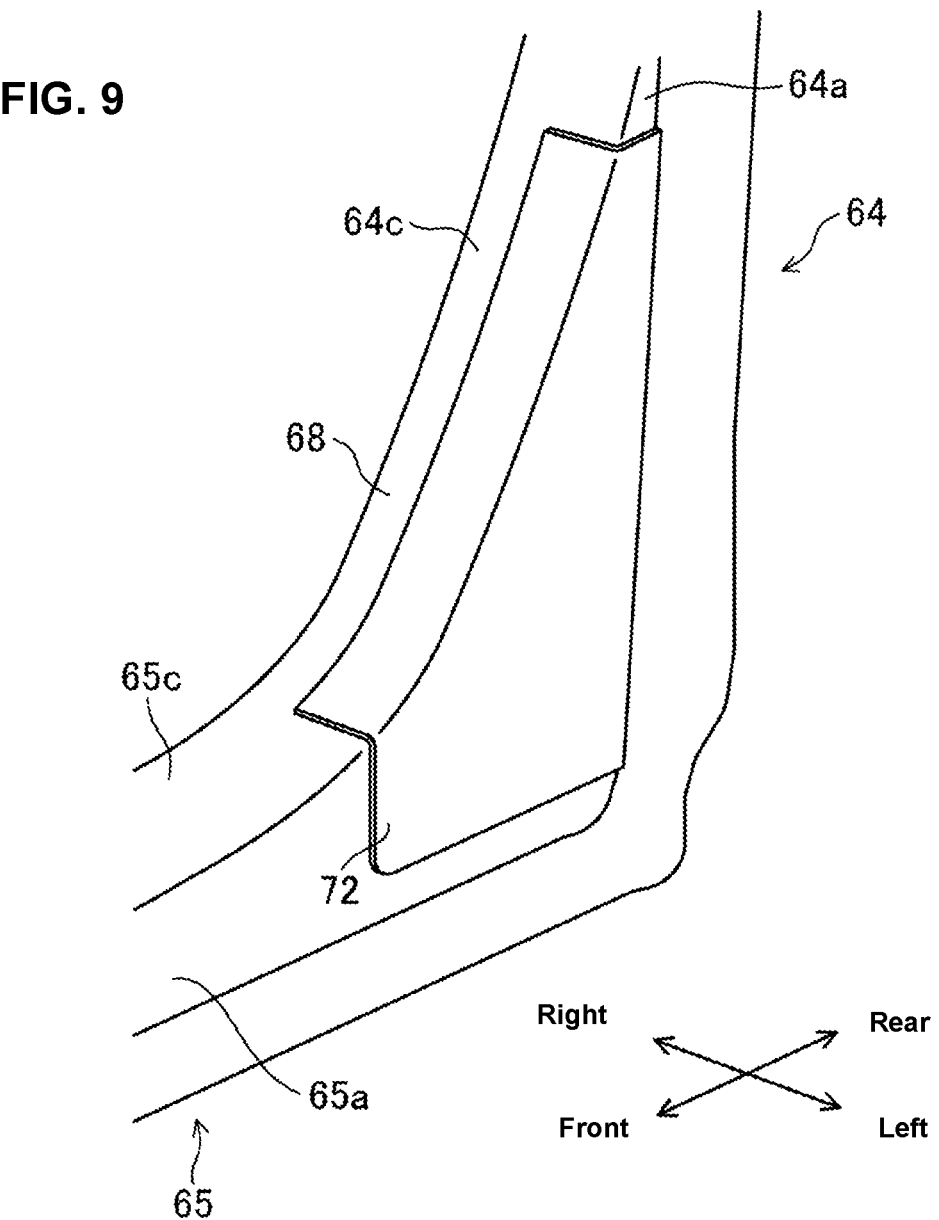
FIG. 9 is a perspective view of a curved portion of a door inner panel, when viewed from a front left side.

The rear-side reinforcement portion 72 is of a curved shape such that it extends along a curve of the curved portion 68 as shown in FIG. 9.

The lower-side reinforcement portion 73 is, as shown in FIG. 4, configured to have a U-shaped cross section which is opened to the right side and to form a closed-cross section cooperatively with the side sill 10. Specifically, the lower-side reinforcement portion 73 is joined to the lower-side outer wall portion 65a and the lower-side connection wall portion 65c such that this portion 73 straddles the ridgeline between the lower-side outer wall portion 65a and the lower-side connection wall portion 65c and thereby the closed-cross section is formed. The lower-side reinforcement portion 73 is provided to overlap with the upper-side side-sill flange 13 and the side-sill side wall portion 12c of the side sill 10 in the vehicle side view (i.e., when viewed from the vehicle width direction). Further, the lower-side reinforcement portion 73 is provided to overlap with the first floor cross member 17 in the vehicle side view (i.e., when viewed from the vehicle width direction).

The upper-side reinforcement portion 74 is a patch member which is attached along a right-side part of the window frame portion 67 as shown in FIG. 7. The upper-side reinforcement portion 74 is provided to overlap with the roof-side flange 34 of the roof side rail 31 in the vehicle side view (i.e., when viewed from the vehicle width direction). Further, the upper-side reinforcement portion 74 is located at the same position, in the longitudinal direction, as the roof cross member 36.

The door outer panel 62 determines an outer shape (contour) of the front side door 5, when viewed from an outward side, in the vehicle width direction, of the vehicle 1 as shown in FIG. 1.

Herein, the rear side door 6 also comprises plural reinforcement portions similarly to the front side door 5. These reinforcement portions are provided at respective portions of a door panel portion of the rear side door 6 which overlap with the center pillar 40, the wheel arch 50, the side sill 10, and the roof side rail 31 in the vehicle side view (i.e., when viewed from the vehicle width direction).

Herein, the vehicle-body structure of the vehicle 1 is required to suppress the center pillar 40 from coming into the cabin as much as possible in the vehicle side view. Further, the weight reduction of the vehicle 1 is recently required from viewpoints of the fuel economy and the like. Therefore, it is necessary to compatibly attain the further weight reduction of the vehicle and increasing of the amount of absorption of the collision load in the vehicle side collision.

If the frame members are arranged between the door inner panel 61 and the door outer panel 62 like a conventional side door, the transmission efficiency of the load may be improved. However, the weight of the vehicle improperly is increased in this case. Therefore, some structure without any frame member arranged may be required.

Herein, according to the present embodiment of the invention, buckling deformation of the door inner panel 61 is so suppressed in the vehicle side collision by providing the reinforcement portions 71-74 at the door inner panel 61 as described above that the collision load can be efficiently transmitted to the vehicle-body frame member 2. Hereafter, a motion of the door panel portion 60 in the vehicle side collision will be described referring to FIGS. 10-14. Herein, FIGS. 10-14 show a case where a collision object A collides with the left-side part of the vehicle 1. Further, FIGS. 10-14 show the motion of the door panel portion 60 of the front side door 5, omitting illustration of a motion regarding the rear side door 6.

Figure 10:
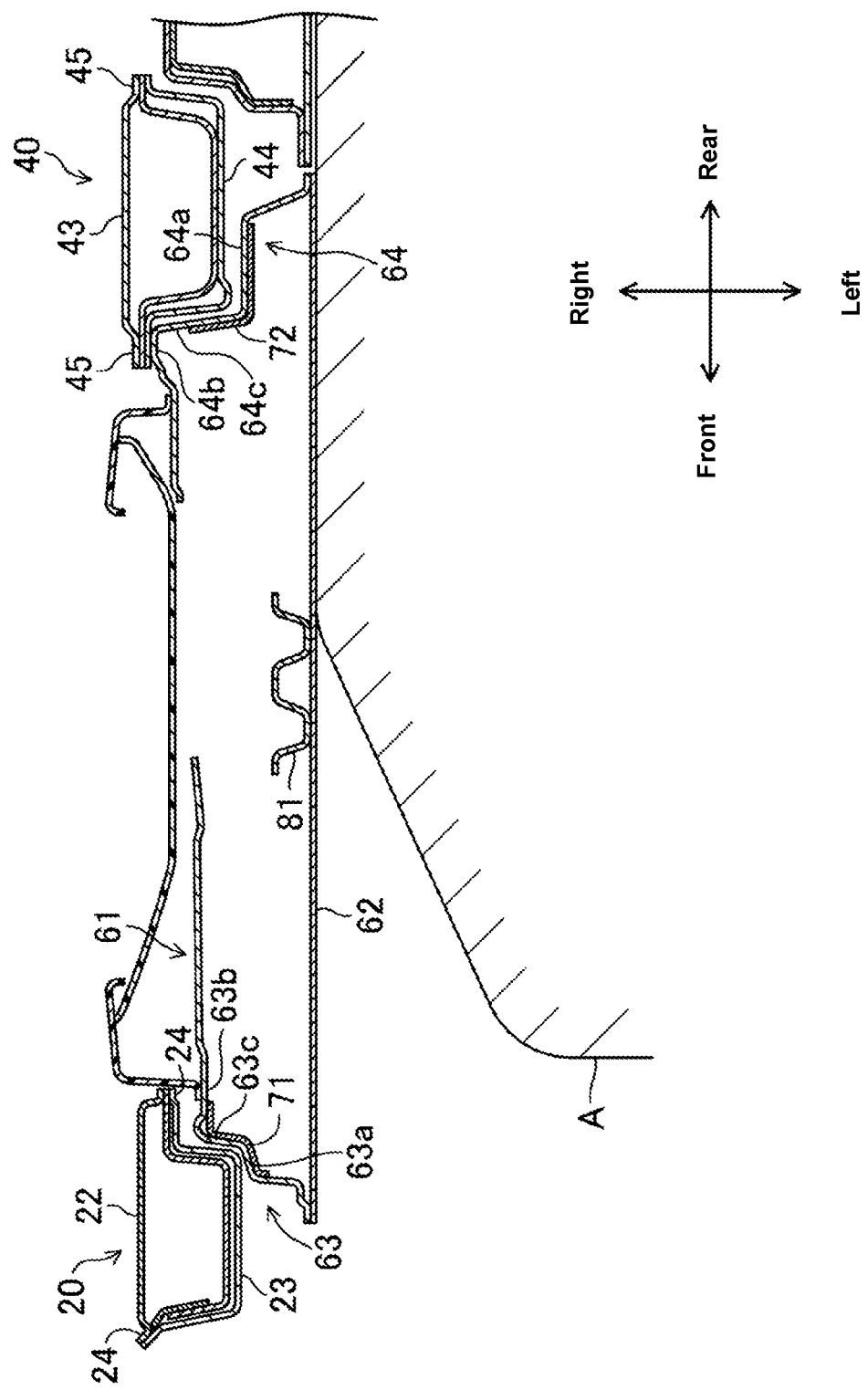
FIG. 10 is a plan view showing a state where a collision object contacts the front side door in a vehicle side collision.

A situation where the collision object A moves toward the center pillar 40 and then contacts the left-side part of the vehicle 1 as shown in FIG. 10 is assumed here. Herein, the inner rear portion 64 is in a state where it is interposed between the center pillar 40 and the collision object A.

Figure 11:
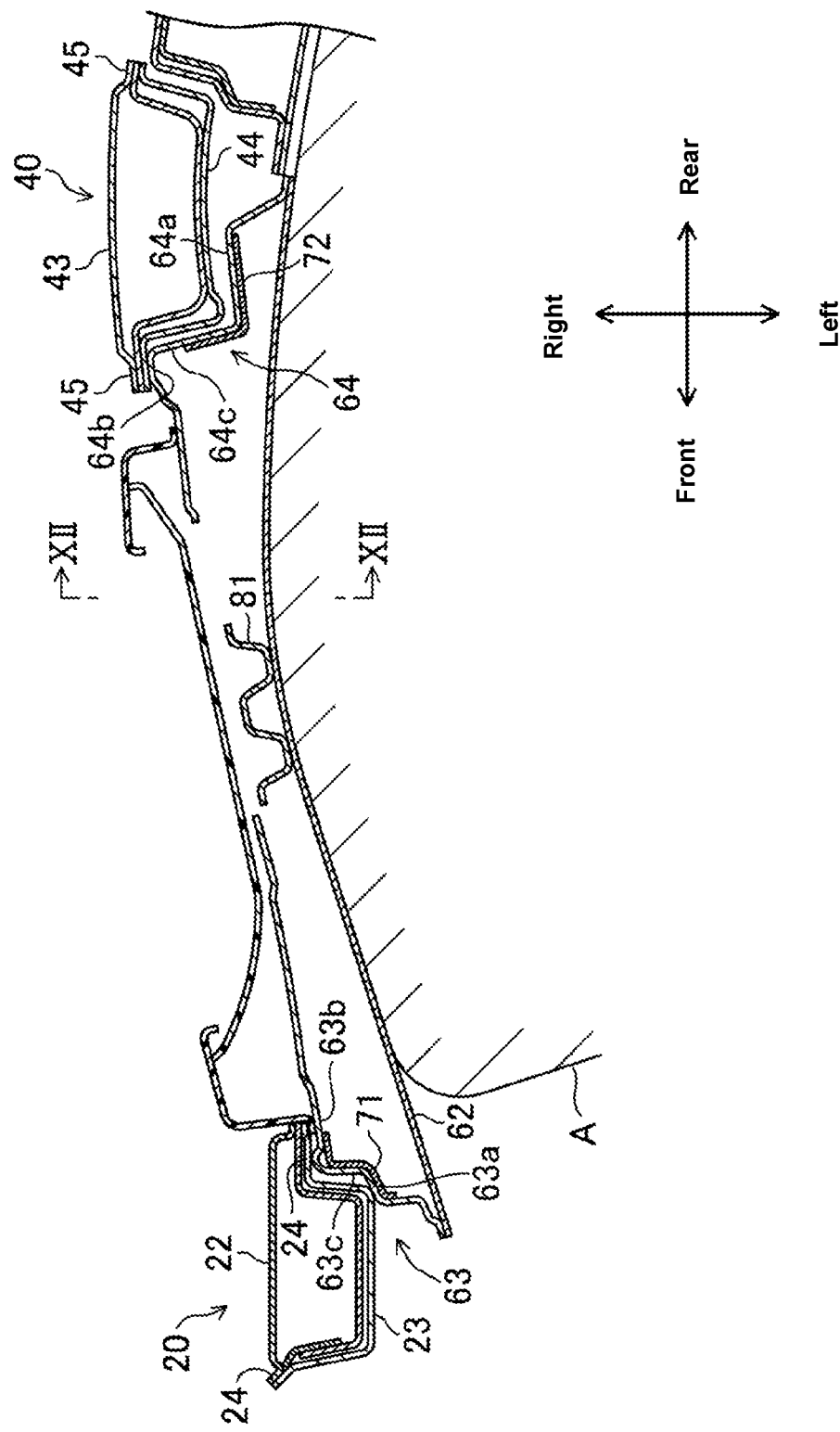
FIG. 11 is a plan view showing a state where the collision object comes into a cabin from the state shown in FIG. 10.

When the collision object A comes in as shown in FIG. 11 from the state shown in FIG. 10, a load directed to a cabin inside (to the right side in this figure) is inputted (applied). Herein, the front side door 5 is moved (pushed) to the right side and deformed such that its rear side is positioned at the right side. Accordingly, as shown in FIG. 11, the inner front portion 63 and the rear-side hinge-pillar flange 24 of the hinge pillar 20 come to contact each other, and the inner rear portion 64 and the front-side center-pillar flange 45 of the center pillar 40 come to contact each other. At this moment, the inner front portion 63 transmits the collision load to the hinge pillar 20 and also receives a reaction load from the hinge pillar 20. Further, the inner front portion 63 receives a force directed to the inside, in the surface direction, of the door inner panel 61 (to the rear side in this figure) through this coming-in of the collision object A. Meanwhile, the inner rear portion 64 transmits the collision load to the center pillar 40 and also receives a reaction load from the center pillar 40.

Figure 12:
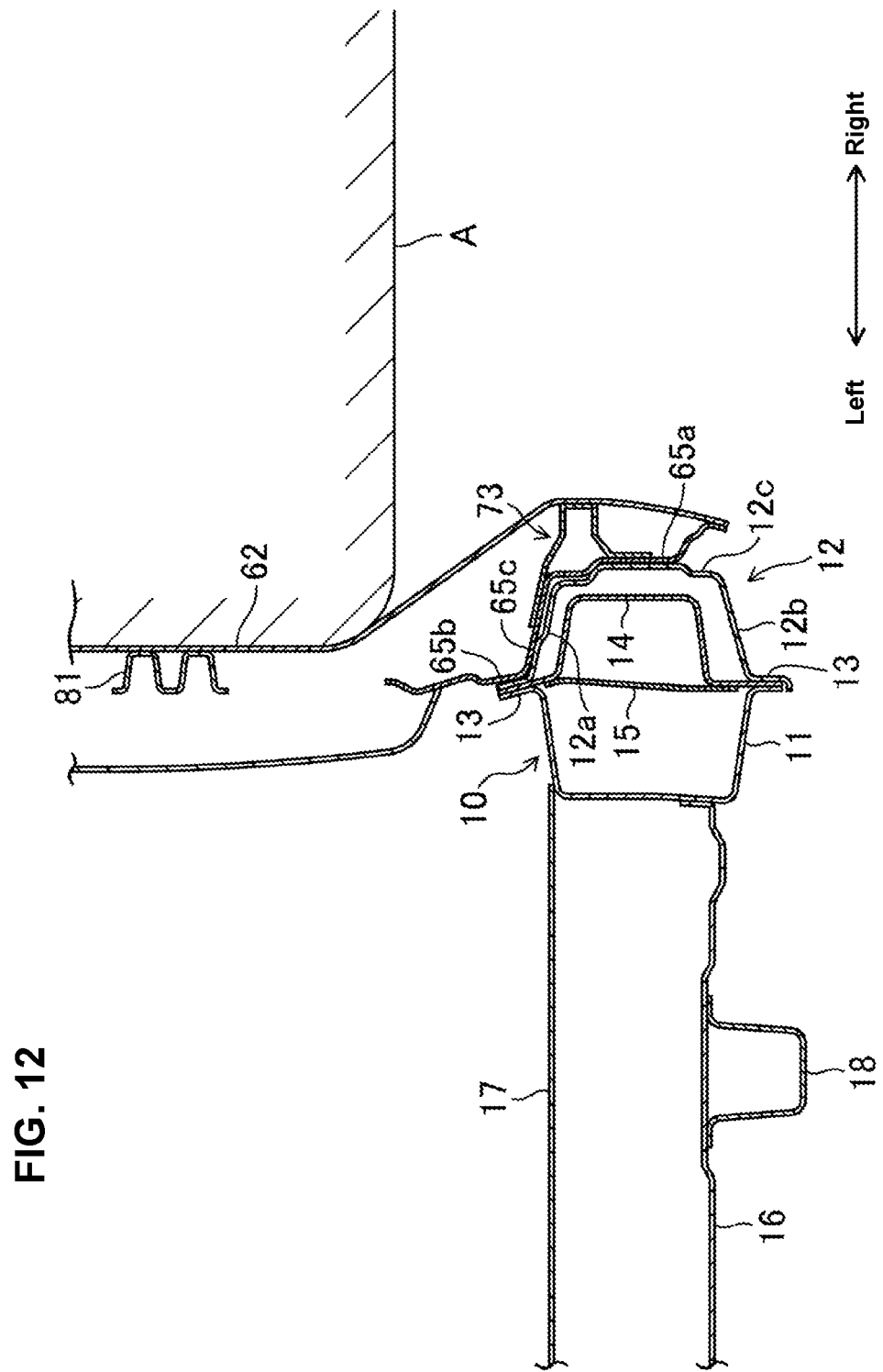
FIG. 12 is a sectional view taken along line XII-XII of FIG. 11.

Further, as shown in FIG. 12, the inner lower portion 65 comes to contact the upper-side side-sill flange 13 and the side-sill side wall portion 12c of the side sill 10. Accordingly, the inner lower portion 65 transmits the collision load to the side sill 10 and also receives a reaction force from the side sill 10. Further, the inner lower portion 65 receives the force directed to the inside, in the surface direction, of the door inner panel 61 (to the upper side in this figure) through the coming-in of the collision object A.

Also, the widow frame portion 67 comes to contact the roof side rail 31, which is not illustrated. Accordingly, the widow frame portion 67 transmits the collision load to the roof side rail 31 and also receives a reaction force from the roof side rail 31. Further, the roof side rail 31 receives the force directed to the inside, in the surface direction, of the door inner panel 61 (to the lower side in this figure) through the coming-in of the collision object A.

Figure 13:
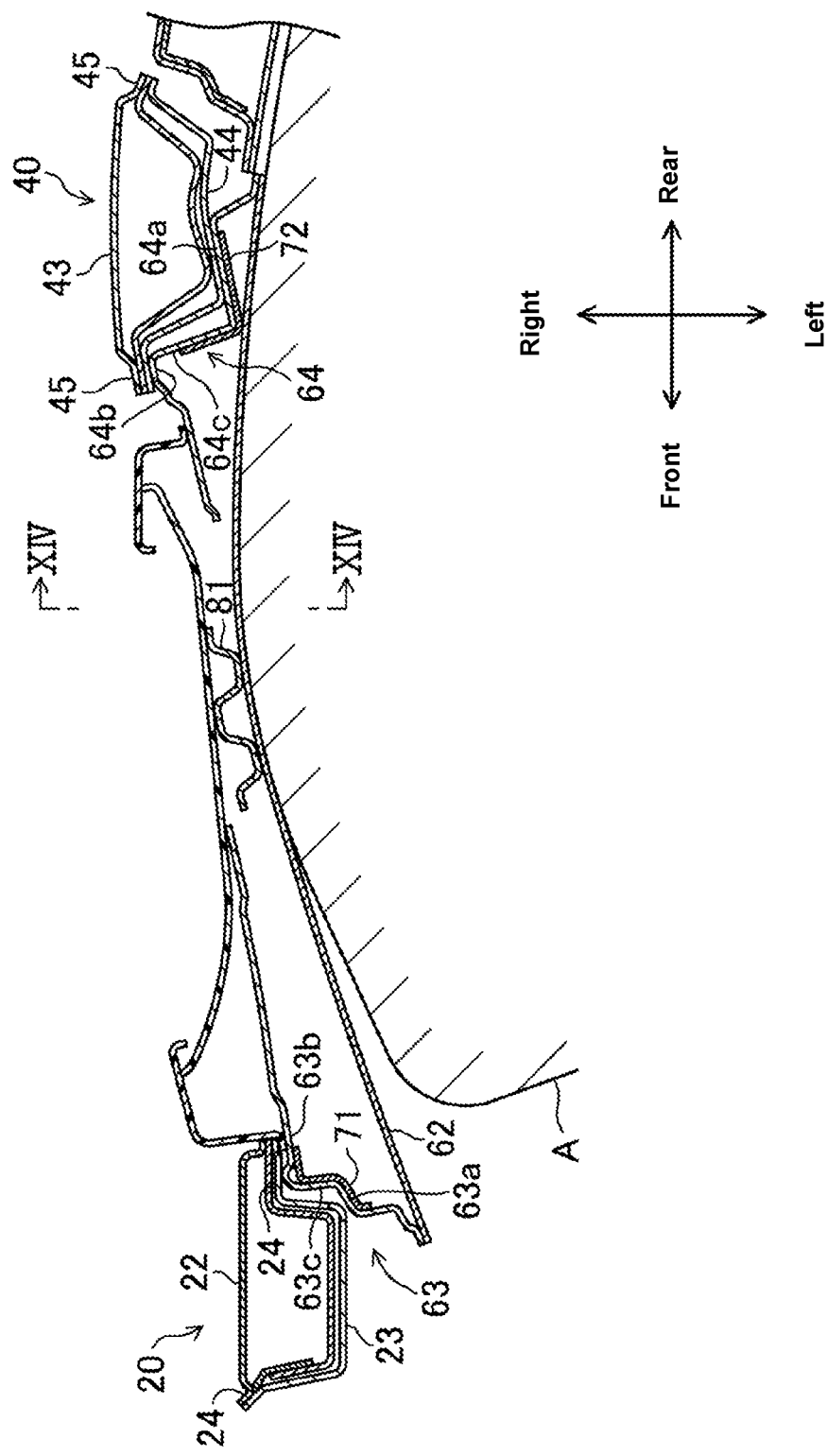
FIG. 13 is a plan view showing a state where the collision object further comes into the cabin from the state shown in FIG. 11.

A situation where the collision object A further comes in to the right side from the state of FIG. 11 as shown in FIG. 13 is assumed here. The inner front portion 63 is suppressed from being deformed by the front-side reinforcement portion 71. Specifically, the front-side reinforcement portion 71 suppresses the front-side connection wall portion 63c from being bent (bucking deformation) to the inside, in the surface direction, of the door inner panel 61. Thereby, the front-side outer wall portion 63a is suppressed from being deformed to the inside, in the surface direction, of the door inner panel 61. Consequently, the inner front portion 63 maintains its contact state with the hinge pillar 20. Meanwhile, since the inner rear portion 64 is interposed between the collision object A and the center pillar 40 in this collision situation, a contact state of the inner rear portion 64 and the center pillar 40 is maintained. Thus, the transmission of the collision load from the inner front portion 63 to the hinge pillar 20 can be maintained and also the transmission of the collision load from the inner rear portion 64 to the center pillar 40 can be maintained.

As described above, since the front-side reinforcement portion 71 overlaps with the instrument-panel member 26 in the vehicle side view (i.e., when viewed from the vehicle width direction), the collision load of the vehicle side collision is transmitted from the front-side reinforcement portion 71 to the instrument-panel member 26 by way of the hinge pillar 20. Since it extends in the vehicle width direction, the instrument-panel member 26 can receive the collision load properly. Further, since the rear-side reinforcement portion 72 is located at the same position, in the vehicle longitudinal direction, as the second floor cross member 47 as described above, the collision load of the vehicle side collision is transmitted from the rear-side reinforcement portion 72 to the second floor cross member 47 by way of the center pillar 47 and the side sill 10. Herein, since it extends in the vehicle width direction, the second floor cross member 47 can receive the collision load properly.

Figure 14:
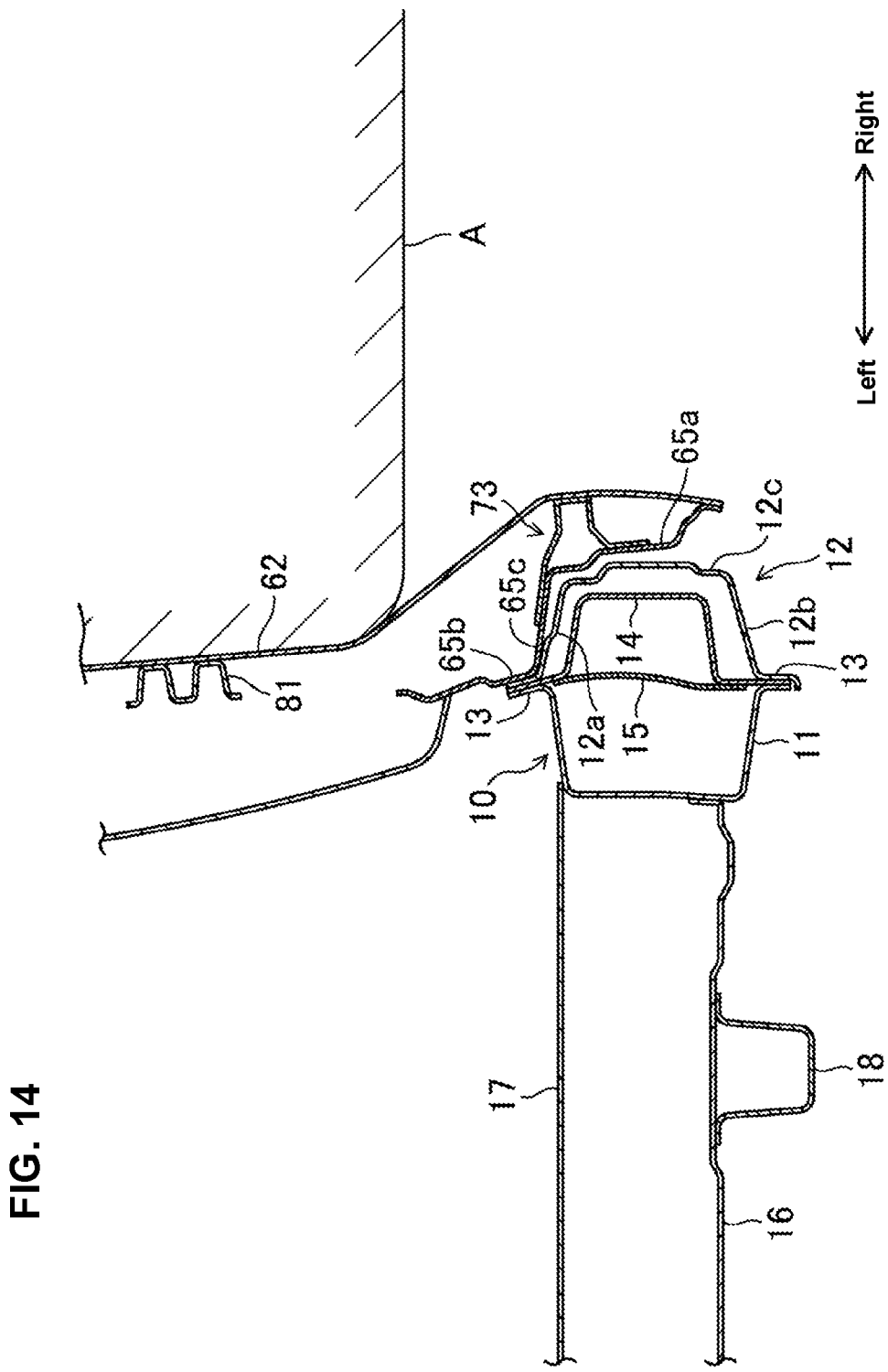
FIG. 14 is a sectional view taken along line XIV-XIV of FIG. 13.

Meanwhile, as shown in FIG. 14, the inner lower portion 65 is suppressed from being deformed by the lower-side reinforcement portion 73. Specifically, the lower-side reinforcement portion 73 suppresses the lower-side connection wall portion 65c from being bent (buckling deformation) to the inside, in the surface direction, of the door inner panel 61. Thereby, the lower-side outer wall portion 65a is suppressed from being deformed to the inside, in the surface direction, of the door inner panel 61. Consequently, the inner lower portion 65 maintains its contact state with the side sill 10. Thus, the transmission of the collision load from the inner lower portion 65 to the side sill 10 can be maintained.

As described above, since the lower-side reinforcement portion 73 overlaps with the first floor cross member 17 in the vehicle side view (i.e., when viewed from the vehicle width direction), the collision load of the vehicle side collision is transmitted from the lower-side reinforcement portion 73 to the first floor cross member 17 by way of the side sill 10. Since it extends in the vehicle width direction, the first floor cross member 17 can receive the collision load properly.

Further, the upper-side connection wall portion 67c of the window frame portion 67 is suppressed from having buckling deformation by the upper-side reinforcement portion 74, which is not illustrated. Thereby, the contact state of the window frame portion 67 and the roof side rail 31 is maintained. Accordingly, the transmission of the collision load from the window frame portion 67 to the rood side rail 31 can be maintained.

Since the upper-side reinforcement portion 74 is located at the same position, in the vehicle longitudinal direction, as the roof cross member 36 as described above, the collision load of the vehicle side collision is transmitted from the upper-side reinforcement portion 74 to the roof cross member 36 by way of the roof side rail 31. Since it extends in the vehicle width direction, the roof cross member 36 can receive the collision load properly.

As described above, in the vehicle side collision, the collision load of the vehicle side collision is transmitted from the front side door 5 to the vehicle-body frame member 2, being dispersed to a whole part of the door panel portion 60, by maintaining the connection state with the peripheral part of the door panel portion 60. Thereby, the amount of absorption of the collision load can be increased. Further, since the collision load of the vehicle side collision is suppressed from being concentrated at the center pillar 40, the center pillar 40 can be suppressed from coming into the cabin as much as possible.

Thus, according to the present embodiment, the front side door 5 comprises the door panel portion 60 and the reinforcement portions 71-74 provided at the peripheral part (the inner front portion 63, the inner rear portion 64, the inner lower portion 65, and the window frame portion 67) of the door panel portion 60 such that these reinforcement portions 71-74 respectively overlap with the vehicle-body frame member 2 in the vehicle side view (i.e., when viewed from the vehicle width direction), wherein the reinforcement portions 71-74 are made of the plate member. Thereby, the rigidity of the door panel portion 60 against the reaction load applied from the vehicle-body frame member 2 in the vehicle side collision is increased. Accordingly, the deformation of the peripheral part of the door panel portion 60 is suppressed by the reinforcement portions 71-74. Consequently, even if it receives the collision load and the reaction load from the vehicle-body frame member 2, the door panel portion 60 remains contacting with the vehicle-body frame member 2 without coming into the cabin. Therefore, the collision load of the vehicle side collision is transmitted from the front side door 5 to the vehicle-body frame member 2, being dispersed to the whole part of the door panel portion 60. Further, since the reinforcement portions 71-74 are made of the plate member, the weight increase of the front side door 5 can be suppressed as much as possible.

Accordingly, the weight reduction of the vehicle 1 and increasing of the amount of absorption of the collision load in the vehicle side collision can be compatibly attained.

Further, in the present embodiment, the vehicle-body frame member 2 comprises the side sill 10, the hinge pillar 20, the center pillar 40, and the roof side rail 31, the peripheral part of the door panel portion 60 comprises the plural overlapping portions which respectively overlap with the side sill 10, the hinge pillar 20, the center pillar 40, and the roof side rail 31 in the vehicle side view (i.e., when viewed from the vehicle width direction), and the reinforcement portions 71-74 comprise the lower-side reinforcement portion 73 attached to the lower-side outer wall portion 65a which overlaps with the side sill 10, the front-side reinforcement portion 71 attached to the front-side outer wall portion 63a which overlaps with the hinge pillar 20, the rear-side reinforcement portion 72 attached to the rear-side outer wall portion 64a which overlaps with the center pillar 40, and the upper-side reinforcement portion 74 attached to the upper-side outer wall portion 67a and the upper-side connection wall portion 67c which overlaps with the roof side rail 31. Accordingly, since the reinforcement portions 71-74 are respectively provided at a front side, a rear side, an upper side and a lower side of the front side door 5, the deformation of the front side door 5 can be effectively suppressed in the vehicle side collision. Thereby, the collision load can be transmitted from the whole part of the front side door 5 to the vehicle-body frame member 2. Consequently, the amount of absorption of the collision load in the vehicle side collision can be more increased.

Moreover, in the present embodiment, the vehicle-body frame member 2 comprises the first floor cross member 17 provided at the position which overlaps with the side sill 10 in the vehicle side view (i.e., when viewed from the vehicle width direction) and extending in the vehicle width direction, and the lower-side reinforcement portion 73 is configured to overlap with the first floor cross member 17 in the vehicle side view (i.e., when viewed from the vehicle width direction). That is, a portion of the side sill 10 which overlaps with the first floor cross member 17 has the high rigidity against the collision load applied from the vehicle side. Accordingly, since the lower-side reinforcement 73 is configured to overlap with the first floor cross member 17 in the vehicle side view (i.e., when viewed from the vehicle width direction), the collision load of the vehicle side collision can be effectively transmitted to the vehicle-body frame member 2. Consequently, the amount of absorption of the collision load in the vehicle side collision can be further increased.

Also, in the present embodiment, the vehicle-body frame member 2 comprises the instrument-panel member 26 provided at a position which overlaps with the hinge pillar 20 in the vehicle side view (i.e., when viewed from the vehicle width direction) and extending in the vehicle width direction, and the front-side reinforcement portion 71 is configured to overlap with the instrument-panel member 26 in the vehicle side view (i.e., when viewed from the vehicle width direction). That is, a portion of the hinge pillar 20 which overlaps with the instrument-panel member 26 has the high rigidity against the collision load applied from the vehicle side. Accordingly, since the front-side reinforcement portion 71 is configured to overlap with the instrument-panel member 26 in the vehicle side view (i.e., when viewed from the vehicle width direction), the collision load of the vehicle side collision can be effectively transmitted to the vehicle-body frame member 2. Consequently, the amount of absorption of the collision load in the vehicle side collision can be further increased.

The present invention should not be limited to the above-described embodiment and any other modifications or improvements may be applied within the scope of a spirit of the present invention.

For example, while the reinforcement portions 71-74 are provided at the door inner panel 61 in the above-described embodiment, these portions may be provided at a peripheral portion of the door outer panel 62. In this case, deformation of the door outer panel 62 in the vehicle side collision is so suppressed that it is suppressed that the side door is pushed into the cabin, so that a connection state of the door panel portion 60 and the vehicle-body frame member 2 is maintained.

Further, while the case where the contact state of the door inner panel 61 and the vehicle-body frame member 2 is maintained in the vehicle side collision is described in the above-described embodiment, an engagement state of the door panel portion 60 and the vehicle-body frame member 2 may be maintained by providing catcher pins as the reinforcement portions 71-74.

Moreover, while the door inner panel 61 (the inner lower portion 65) forms the closed-cross section together with only the lower-side reinforcement portion 73 in the above-described embodiment, the front-side reinforcement portion 71, the rear-side reinforcement portion 72, or the upper-side reinforcement portion 74 may form a closed-cross section together with the door inner panel 61. On the contrary, the lower-side reinforcement portion 73 may be a patch member attached along the lower-side outer wall portion 65a, the lower-side inner wall portion 65b, and the lower-side connection wall portion 65c, similarly to the front-side reinforcement portion 71 and so on.

Also, a part or a whole part of the reinforcement portions 71-74 may not be configured to be a separate member from the door inner panel 61. In this case, the reinforcement portions 71-74 can be configured by making the plate thickness of a portion of the door inner panel 61 which corresponds to the reinforcement portions 71-74 thicker than the other part of the door inner panel 61, for example.

Further, while the reinforcement portions are the front-side reinforcement portion 71, the rear-side reinforcement portion 72, the lower-side reinforcement portion 73, and the upper-side reinforcement portion 74 in the above-described embodiment, the front-side reinforcement portion 71 and the upper-side reinforcement portion 74 may be omitted as long as the rear-side reinforcement portion 72 and the lower-side reinforcement portion 73 are provided. In this case, it is preferable that the rear-side reinforcement portion 72 and the lower-side reinforcement portion 73 be extended as much as possible.

What is claimed is:

1. A vehicle-body structure of a vehicle, comprising:
a vehicle-body frame member forming an opening portion for entrance at a vehicle side part; and
a side door provided so as to open and close the opening portion,
wherein said side door comprises a door panel portion and a reinforcement portion provided at a peripheral part of the door panel portion such that the reinforcement portion overlaps with said vehicle-body frame member in a vehicle side view, said reinforcement portion being a plate member;
wherein said vehicle-body frame member comprises a side sill, a hinge pillar, a center pillar, and a roof side rail, the peripheral part of said door panel portion comprises plural overlapping portions which respectively overlap with said side sill, said hinge pillar, said center pillar, and said roof side rail in the vehicle side view, and said reinforcement portion comprises a lower-side reinforcement portion attached to said overlapping portion which overlaps with the side sill, a front-side reinforcement portion attached to said overlapping portion which overlaps with the hinge pillar, a rear-side reinforcement portion attached to said overlapping portion which overlaps with the center pillar, and an upper-side reinforcement portion attached to said overlapping portion which overlaps with the roof side rail;
wherein the front-side reinforcement portion overlaps with a rear-side hinge-pillar flange and a hinge-pillar side wall portion of the hinge pillar in the vehicle side view,
wherein the rear-side reinforcement portion overlaps with a front-side center-pillar flange and a center-pillar-side wall portion of the center pillar in the vehicle side view,
wherein the lower-side reinforcement portion overlaps with an upper-side side-sill flange and a side-sill side wall portion of the side sill in the vehicle side view, and
wherein the upper-side reinforcement portion overlaps with a roof-side flange of the roof-side rail in the vehicle side view.

2. The vehicle-body structure of the vehicle of claim 1, wherein said vehicle-body frame member comprises a floor cross member provided at a position which overlaps with said side sill in the vehicle side view and extending in a vehicle width direction, and said lower-side reinforcement portion is configured to overlap with said floor cross member in the vehicle side view.

3. The vehicle-body structure of the vehicle of claim 1, wherein said vehicle-body frame member comprises an instrument-panel member provided at a position which overlaps with said hinge pillar in the vehicle side view and extending in the vehicle width direction, and said front-side reinforcement portion is configured to overlap with said instrument-panel member in the vehicle side view.

4. The vehicle-body structure of the vehicle of claim 2, wherein said vehicle-body frame member comprises an instrument-panel member provided at a position which overlaps with said hinge pillar in the vehicle side view and extending in the vehicle width direction, and said front-side reinforcement portion is configured to overlap with said instrument-panel member in the vehicle side view.

5. The vehicle-body structure of the vehicle of claim 1, wherein a surface of the front-side reinforcement portion extending along a front-side connection wall portion of the inner front portion of the door panel portion overlaps with the rear-side hinge-pillar flange.

6. The vehicle-body structure of the vehicle of claim 1, wherein a surface of the rear-side reinforcement portion extending along a rear-side connection wall portion of the inner rear portion of the door panel portion overlaps with the front-side center-pillar flange.

7. The vehicle-body structure of the vehicle of claim 1, wherein a surface of the lower-side reinforcement portion extending along a lower-side connection wall portion of the inner lower portion of the door panel portion overlaps with the upper-side side-sill flange.

* * * * *